2,944,916
PROCESSING OF IMAGE DISPLAY DEVICES

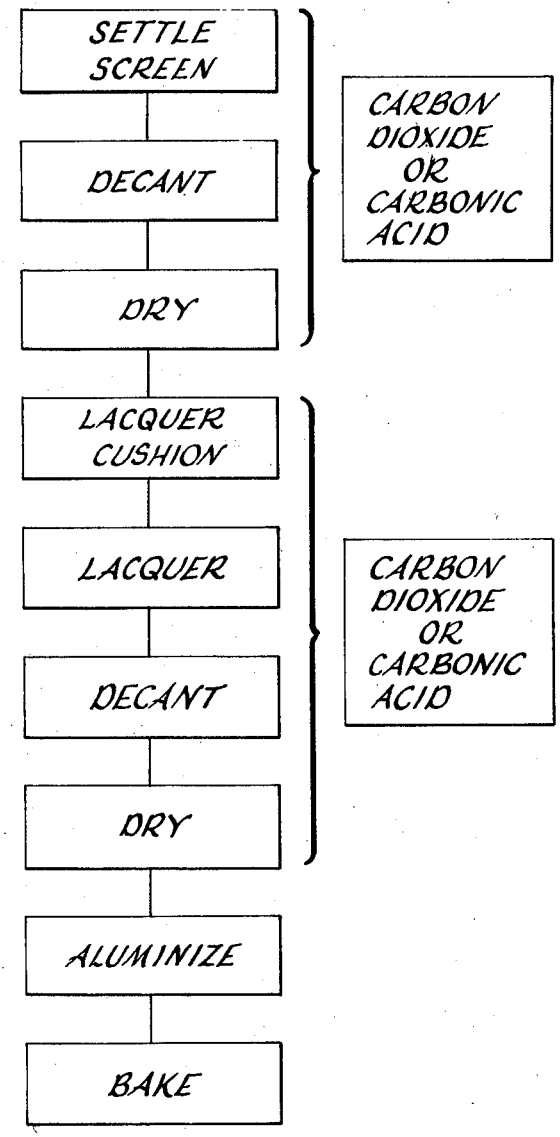

Lyle W. Evans, Seneca Falls, N.Y., assignor, by mesne assignments, to Sylvania Electric Products Inc., Wilmington, Del., a corporation of Delaware Filed Sept. 26, 1957, Ser. No. 686,543

2 Claims. (Cl. 117—33.5)

This invention relates to image display devices and more particularly to processing of screens for such devices.

An image display device such as a cathode ray tube generally utilizes a phosphor screen which fluoresces upon impingement of the scanning electron beam or beams employed in the tube. The screen may be formed by any well-known method including phosphor slurry, photo-printing, or silk screening techniques or a settling process wherein the phosphor is settled through a liquid cushion onto the face panel of the tube. For aluminized tubes, after the phosphor layer has been formed, a film of lacquer may be deposited thereon to serve as a base for the subsequently applied film of aluminum. The screen may then be baked to remove the lacquer and other volatile impurities existing in the screen materials.

One of the largest reject items encountered in the fabrication of image display screens of the type described above has its basis in the "wet" and "dry" strength characteristics of the screen during and after processing. These rejects occur whenever a screen peels or separates from the glass face plate of the tube or whenever the aluminum peels or separates from the phosphor layer. This may occur during processing when the screen is wet or after it has been dried or it may occur in the finished tube. One proposed method for increasing the bonding strength of screens utilizes the application of boric oxide to the screen while another method includes the use of barium acetate in the lacquer cushion fluid. Although these methods increase the bonding strength of the screen layers to some extent, the improvement is relatively small, and there is a tendency for such materials to affect the light output of the tube and to increase the gas level.

Accordingly, it is an object of the invention to reduce the aforementioned disadvantages and to increase the bonding strength of cathode ray tube screen layers to one another and to the face panel of the tube.

A further object is to fabricate an improved image display screen.

The foregoing objects are achieved in one aspect of the invention by the provision of a process for making image display screens which utilizes the application of carbon dioxide or carbonic acid in one or more steps of the process to aid in the "wet" and "dry" strength characteristics of the screen.

For a better understanding of the invention, reference is made to the following description taken in conjunction with the accompanying drawing which illustrates the steps employed in one technique for processing image display screens.

In the fabrication of screens for cathode ray tubes, the fluorescent material may be deposited upon the internal surface of the face panel by a settling technique. The settling solution used may comprise an aqueous colloidal suspension including a binder for the fluorescent material particles, and a gelling agent for the binder. The settling cushion may be formed by diluting a concentrated gelling agent with water to form a solution which is then dispensed into the cathode ray tube envelope so that it covers the face panel. The volume of gelling solution may be sufficient to provide several inches of fluid over the face panel. For example, approximately 25 liters of the solution may be used in a 21 inch cathode ray tube. After the gelling solution has been dispensed, a mixture of fluorescent materials and an aqueous solution of the binder may be introduced into the bulb. The fluorescent material particles become intimately associated with the binder, which is gelled by the gelling agent during settling. The binder functions to cause these particles to adhere to one another and to the glass face panel. Subsequently, the binder and gelling solutions are decanted from the tube envelope, and the remaining coating is dried to provide an intimately mixed phosphor material and binder layer serving as the fluorescent screen layer.

The fluorescent materials employed in the screen may be any conventional type of electric field and/or electron-responsive inorganic material such as those formed from sulfides, oxides, tungstates, aluminates, borates, selenides, phosphates or silicates of one or more metals consisting of zinc, cadmium, beryllium, magnesium, manganese, calcium, strontium and others well-known in the art. The materials may be activated by metals such as silver, copper and manganese.

Any well-known binder may be used in the process such as silicates of potassium and sodium. These binders may be readily gelled with the application of agents which include salts such as barium acetate, barium nitrate, ammonium compounds such as ammonium carbonate, ammonium sulfate, ammonium chloride, etc. or acids such as phosphoric, acetic or boric acids, and other organic and inorganic materials well-known in the art of colloid chemistry.

It has been found that the introduction of carbon dioxide or carbonic acid into one or more of the screen processing steps recited above greatly improves the ability of the phosphor screen layer to adhere to the face panel of the tube. For instance, a dry screen fabricated without using carbon dioxide or carbonic acid, when tested, tends to be blown from the face panel by an air pressure of approximately 14 pounds per square inch whereas a dry screen that has been treated with carbon dioxide or carbonic acid can withstand an air pressure of 80 pounds per square inch or greater. This increased bonding strength provides many advantages since the tubes can be handled with less caution and at greater speeds, the control of composition percentages becomes less critical, and a heavier lacquer which provides a smoother reflective coating can be used. It is believed that these advantages are brought about by the tendency of carbonic acid or carbon dioxide to substantially increase the polymerization of the binder or silicate which envelops the phosphor particles, thereby providing an increased bonding between the particles themselves and between the phosphor layer and the glass face panel.

The carbonic acid may be introduced into the screen either by direct application or by bubbling carbon dioxide into either the gelling solution, the binder and phosphor solution, the settling cushion fluid after it has been formed or into the envelope after decanting, as shown in the drawing. For example, carbon dioxide may be issued into the tube envelope subsequent to decanting the settling solution. This gas is believed to combine with the wet screen material to form carbonic acid, thereby facilitating increased polymerization of the binder or silicate.

The contrast characteristic of an image display screen is improved by the application of a smooth electron permeable light reflective metallic coating over the phosphor layer. This coating may comprise a light reflective metal such as aluminum, tin, silver or chromium. In order to form the desired smooth reflective surface, it is necessary to first deposit a smooth base upon which the metallic coating may be deposited. This smooth surface is usually developed by the use of a lacquer film which may be applied by a flotation and decanting operation. In this process, a quantity of cushioning liquid is first dispensed into the cathode ray tube envelope so that it covers the phosphor layer with several inches of the liquid. For instance, approximately 7 liters of the liquid may be dispensed into a 21 inch cathode ray tube. A small quantity of lacquer solvent may be then dispensed into the fluid. For nitrocellulose lacquers, solvents such as amyl, ethyl and butyl acetate may be used. Such solvents as toluene and xylene may be employed with the methacrylate lacquers. This solvent tends to saturate the bulb atmosphere to regulate the lacquer drying rate and to lubricate the liquid cushion surface so as to facilitate spreading of the lacquer after it has been dispensed. The lacquer composition, which is subsequently deposited upon the surface of the lacquer cushion, may comprise a solution of nitrocellulose lacquer in amyl acetate. The stretching characteristics of the lacquer are controlled by the addition of a plasticizer such as dioctal phthalate, tricresyl phosphate, and polyalkalene glycol.

The lacquer solution spreads to cover portions of the liquid cushion and is allowed to stand for a period of time so that the lacquer becomes plastic. When the proper degree of plasticity is achieved, the cathode ray tube envelope is gradually tilted. The floating lacquer film attaches itself to the phosphor layer during this operation, starting at one edge of the face of the tube and continuing across the panel as the level of the liquid recedes. During this decanting operation, the lacquer is stretched over the phosphor layer to achieve the smooth surface desired for the electron permeable material depositing process.

It has been found that the introduction of carbon dioxide or carbonic acid into the lacquering process as shown in the drawing increases the bonding strength of the screen since the gas or liquid will penetrate directly into the phosphor and binder layer if applied to the liquid cushion fluid or this gas or acid will permeate the lacquer film and penetrate into the screen if they are applied after the lacquer film is laid. Excellent bonding results have been achieved by bubbling carbon dioxide into the lacquer cushion water or by issuing carbon dioxide into the envelope after the lacquer film has been deposited. The increase in adherence ability of the screen to the tube face and of the reflective coating to the phosphor layer where carbon dioxide or carbonic acid are added during or after the lacquering operation is comparable to the results indicated above in connection with the introduction of this gas or acid into the settling process.

After the lacquer film has been dried and deposited on the fluorescent screen layer in the manner described above, an electron permeable material such as aluminum may be deposited upon the lacquer by the vaporization of an aluminum pellet. Subsequently, the composite screen is baked in a high temperature atmosphere. During the baking operation, the lacquer volatilizes along with other impurities present in the screen materials and the metallic coating attaches itself to the fluorescent material layer to complete the cathode ray tube screen.

It is to be understood that the processes described herein apply to cathode ray tubes including those adapted for monochrome and color television applications with or without a reflective metallic coating. The screen may be formed by methods other than the settling technique, and the smooth base material, e.g. lacquer, for the reflective coating may be deposited by floatation or by another type of process such as spray coating. It has been found that the addition of carbon dioxide or carbonic acid in any step of the above processes which will allow penetration thereof into the fluorescent material and binder layer will improve the bonding strength of the screen.

Although several embodiments of the invention have been shown and described, it will be apparent to those skilled in the art that various changes and modifications may be made therein without departing from the scope of the invention as defined by the appended claims.

What is claimed is:

1. A process for forming an image display screen on the viewing panel of a cathode ray tube comprising the steps of fabricating a screen layer including a phosphor material and a silicate on the panel, covering said screen layer with a film of lacquer, and issuing carbon dioxide gas into said tube to cause penetration of said gas into the lacquer covered screen layer.

2. A process for forming an image display screen on the viewing panel of a cathode ray tube comprising the steps of fabricating a screen layer including a phosphor material and a silicate on the panel, covering said screen layer with a film of nitrocellulose lacquer, and issuing carbon dioxide gas into said tube to cause penetration of said gas into the lacquer covered screen layer.

References Cited in the file of this patent

UNITED STATES PATENTS

| | | |
|---|---|---|
| 2,108,683 | Leverenz | Feb. 15, 1938 |
| 2,650,884 | Pakswer | Sept. 1, 1953 |
| 2,793,137 | Friedman | May 21, 1957 |